US012688325B2

(12) United States Patent
Yang et al.

(10) Patent No.: US 12,688,325 B2
(45) Date of Patent: *Jul. 21, 2026

(54) FACE ANONYMIZATION IN DIGITAL IMAGES

(71) Applicant: Adobe Inc., San Jose, CA (US)

(72) Inventors: Yang Yang, Santa Clara, CA (US); Zhixin Shu, San Jose, CA (US); Shabnam Ghadar, Menlo Park, CA (US); Jingwan Lu, Santa Clara, CA (US); Jakub Fiser, Seattle, WA (US); Elya Schechtman, Seattle, WA (US); Cameron Y. Smith, Santa Cruz, CA (US); Baldo Antonio Faieta, San Francisco, CA (US); Alex Charles Filipkowski, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/224,916

(22) Filed: Jul. 21, 2023

(65) Prior Publication Data

US 2023/0360299 A1      Nov. 9, 2023

Related U.S. Application Data

(63) Continuation of application No. 17/094,093, filed on Nov. 10, 2020, now Pat. No. 11,748,928.

(51) Int. Cl.
*G06T 11/60* (2026.01)
*G06F 16/532* (2019.01)
(Continued)

(52) U.S. Cl.
CPC ............ *G06T 11/60* (2013.01); *G06F 16/532* (2019.01); *G06F 16/56* (2019.01); *G06F 21/6254* (2013.01); *G06T 2200/24* (2013.01)

(58) Field of Classification Search
CPC .... G06F 16/532; G06F 16/56; G06F 21/6245; G06F 21/6254; G06N 3/045;
(Continued)

(56) References Cited

U.S. PATENT DOCUMENTS 11,106,919 B1 *   8/2021   Balogh ................. G06F 9/4843
11,748,928 B2     9/2023   Yang et al.
(Continued)

OTHER PUBLICATIONS

Muench et al, Data Anonymization for Data Protection on Publicly Recorded Data, Nov. 2019, Lecture Notes in Computer Science (Year: 2019).*

(Continued)

*Primary Examiner* — Andrae S Allison
(74) *Attorney, Agent, or Firm* — FIG. 1 Patents

(57) ABSTRACT

Face anonymization techniques are described that overcome conventional challenges to generate an anonymized face. In one example, a digital object editing system is configured to generate an anonymized face based on a target face and a reference face. As part of this, the digital object editing system employs an encoder as part of machine learning to extract a target encoding of the target face image and a reference encoding of the reference face. The digital object editing system then generates a mixed encoding from the target and reference encodings. The mixed encoding is employed by a machine-learning model of the digital object editing system to generate a mixed face. An object replacement module is used by the digital object editing system to replace the target face in the target digital image with the mixed face.

20 Claims, 7 Drawing Sheets

(51) Int. Cl.
G06F 16/56 (2019.01)
G06F 21/62 (2013.01)

(58) Field of Classification Search
CPC ........ G06N 3/047; G06N 3/08; G06N 3/0455;
G06N 3/0464; G06N 3/0475; G06N
3/094; G06T 11/60; G06T 2200/24
See application file for complete search history.

(56) References Cited

U.S. PATENT DOCUMENTS

| | | | | |
|---|---|---|---|---|
| 2018/0314878 | A1* | 11/2018 | Lee | G06V 40/175 |
| 2019/0012442 | A1* | 1/2019 | Hunegnaw | G06V 40/161 |
| 2019/0122329 | A1* | 4/2019 | Wang | G06V 30/19173 |
| 2020/0033615 | A1* | 1/2020 | Kim | G03H 1/08 |
| 2020/0134858 | A1* | 4/2020 | Yang | G06T 7/0004 |
| 2020/0186721 | A1* | 6/2020 | Ogawa | G06V 10/24 |
| 2022/0012362 | A1* | 1/2022 | Kuta | G06V 10/758 |
| 2022/0148243 | A1 | 5/2022 | Yang et al. | |
| 2023/0138380 | A1* | 5/2023 | Chen | G06F 18/2148 |
| | | | | 382/131 |

OTHER PUBLICATIONS

T. Kim and J. Yang, "Latent-Space-Level Image Anonymization With Adversarial Protector Networks," in IEEE Access, vol. 7, pp. 84992-84999, 2019, (Year: 2019).*

Berretti, Stefano, Alberto Del Bimbo, and Pietro Pala. "3D partial face matching using local shape descriptors." Proceedings of the 2011 joint ACM workshop on Human gesture and behavior understanding. 2011. (Year: 2011).*

"DeepFakes_Faceswap", GitHub.com, deepfakes [retrieved Dec. 10, 2020]. Retrieved from the Internet <https://github.com/deepfakes/faceswap>., Feb. 25, 2018, 11 pages.

"Eigen V3", TuxFamily.org [retrieved Feb. 10, 2021]. Retrieved from the Internet <https://eigen.tuxfamily.org/index.php?title=Main_Page>., Nov. 2019, 13 pages.

U.S. Appl. No. 17/094,093 , "First Action Interview Office Action", U.S. Appl. No. 17/094,093, filed Apr. 5, 2023, 4 pages.

U.S. Appl. No. 17/094,093 , "Notice of Allowance", U.S. Appl. No. 17/094,093, filed May 22, 2023, 7 pages.

U.S. Appl. No. 17/094,093 , "Pre-Interview First Office Action", U.S. Appl. No. 17/094,093, filed Mar. 1, 2023, 3 pages.

Bitouk, Dmitri , et al., "Face Swapping: Automatically Replacing Faces in Photographs", ACM SIGGRAPH 2008 papers [retrieved Dec. 15, 2020]. Retrieved from the Internet <http://citeseerx.ist.psu.edu/viewdoc/download?doi=10.1.1.360.7318&rep=rep1&type=pdf>., Aug. 2008, 6 pages.

Bradski, Gary , et al., "The OpenCV Library", Dr. Dobb's, The World of Software Development Blog [retrieved Mar. 16, 2023]. Retrieved from the Internet <https://www.drdobbs.com/open-source/the-opencv-library/184404319>., Nov. 1, 2000, 7 pages.

Deng, Jiankang , et al., "ArcFace: Additive Angular Margin Loss for Deep Face Recognition", Cornell University arXiv, arXiv.org [retrieved Feb. 20, 2023]. Retrieved from the Internet <https://arxiv.org/pdf/1801.07698.pdf>., Feb. 2019, 11 pages.

He, Kaiming , et al., "Deep Residual Learning for Image Recognition", Proceedings of the IEEE conference on computer vision and pattern recognition, 2016 [retrieved Feb. 18, 2022], Retrieved from the Internet: <https://openaccess.thecvf.com/content_cvpr_2016/papers/He_Deep_Residual_Learning_CVPR_2016_paper.pdf>., Jun. 2016, 12 pages.

Karras, Tero , et al., "A Style-Based Generator Architecture for Generative Adversarial Networks", Cornell University arXiv, arXiv.org [retrieved Jun. 28, 2023]. Retrieved from the Internet <https://arxiv.org/pdf/1812.04948.pdf>., Mar. 29, 2019, 12 pages.

Kemelmacher-Shlizerman, Ira , "Transfiguring Portraits", ACM Transactions on Graphics (TOG) 35, No. 4 [retrieved Dec. 15, 2020]. Retrieved from the Internet <https://homes.cs.washington.edu/~kemelmi/Transfiguring_Portraits_Kemelmacher_SIG-GRAPH2016.pdf>., Jul. 2016, 8 pages.

Naruniec, Jacek , et al., "High-Resolution Neural Face Swapping for Visual Effects", Eurographics Symposium on Rendering 2020, vol. 39, No. 4 [retrieved Dec. 10, 2020]. Retrieved from the Internet <https://studios.disneyresearch.com/wp-content/uploads/2020/06/High-Resolution-Neural-Face-Swapping-for-Visual-Effects.pdf>., Jun. 29, 2020, 16 pages.

Sun, Ke , et al., "Deep High-Resolution Representation Learning for Human Pose Estimation", arXiv Preprint, arXiv.org [retrieved Feb. 10, 2021]. Retrieved from the Internet <https://arxiv.org/pdf/1902.09212.pdf>., Feb. 25, 2019, 12 pages.

Thies, Justus , et al., "Face2Face: Real-Time Face Capture and Reenactment of RGB Videos", Proceedings of the IEEE Conference on Computer Vision and Pattern Recognition (CVPR), 2016 [retrieved Feb. 10, 2021]. Retrieved from the Internet <https://openaccess.thecvf.com/content_cvpr_2016/papers/Thies_Face2Face_Real-Time_Face_CVPR_2016_paper.pdf>., Jun. 2016, 9 pages.

Yang, Fei , et al., "Expression Flow for 3D-Aware Face Component Transfer", ACM Trans. Graph. 30, 4, Article 60 [retrieved Feb. 10, 2021]. Retrieved from the Internet <https://citeseerx.ist.psu.edu/viewdoc/download?doi=10.1.1.366.2005&rep=rep1&type=pdf>., Jul. 2011, 10 pages.

* cited by examiner

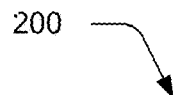
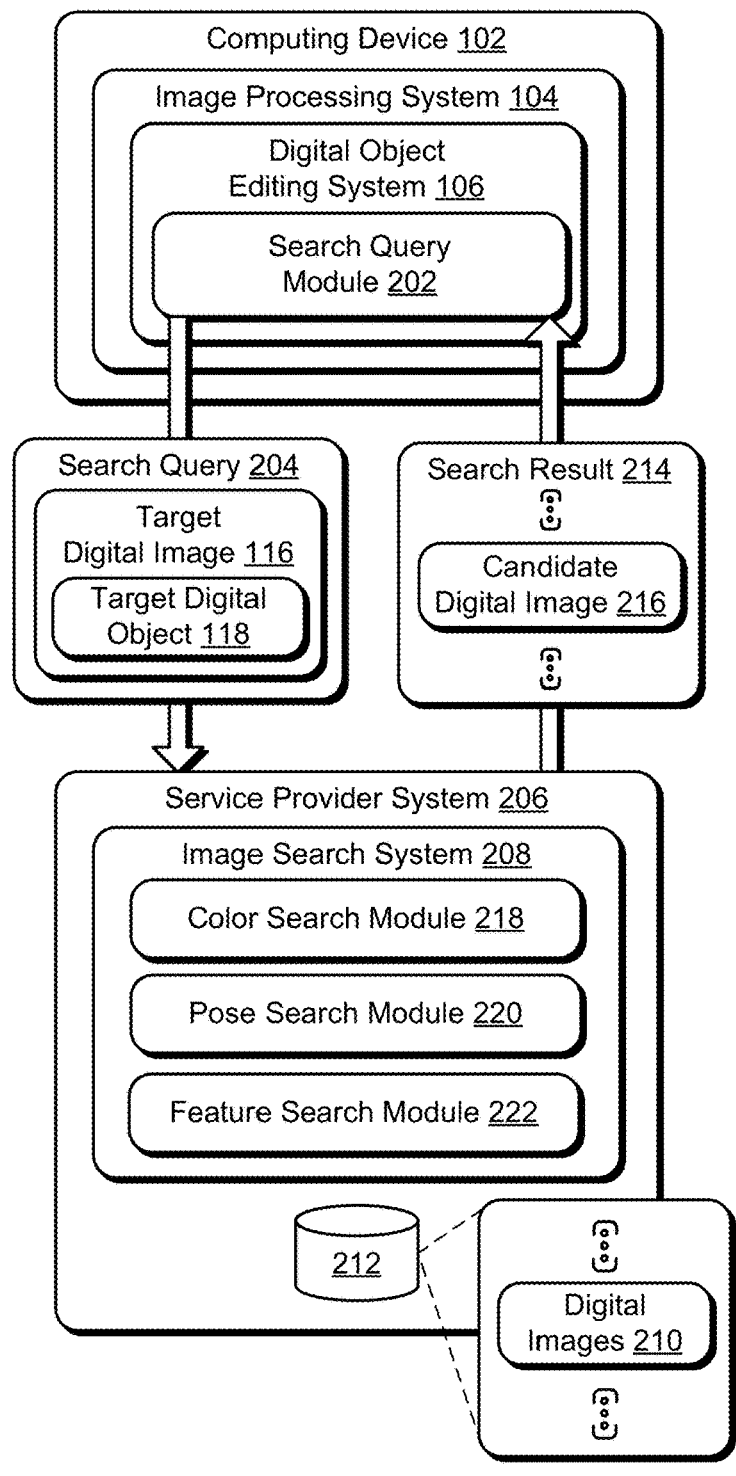
*Fig. 2*

400
402
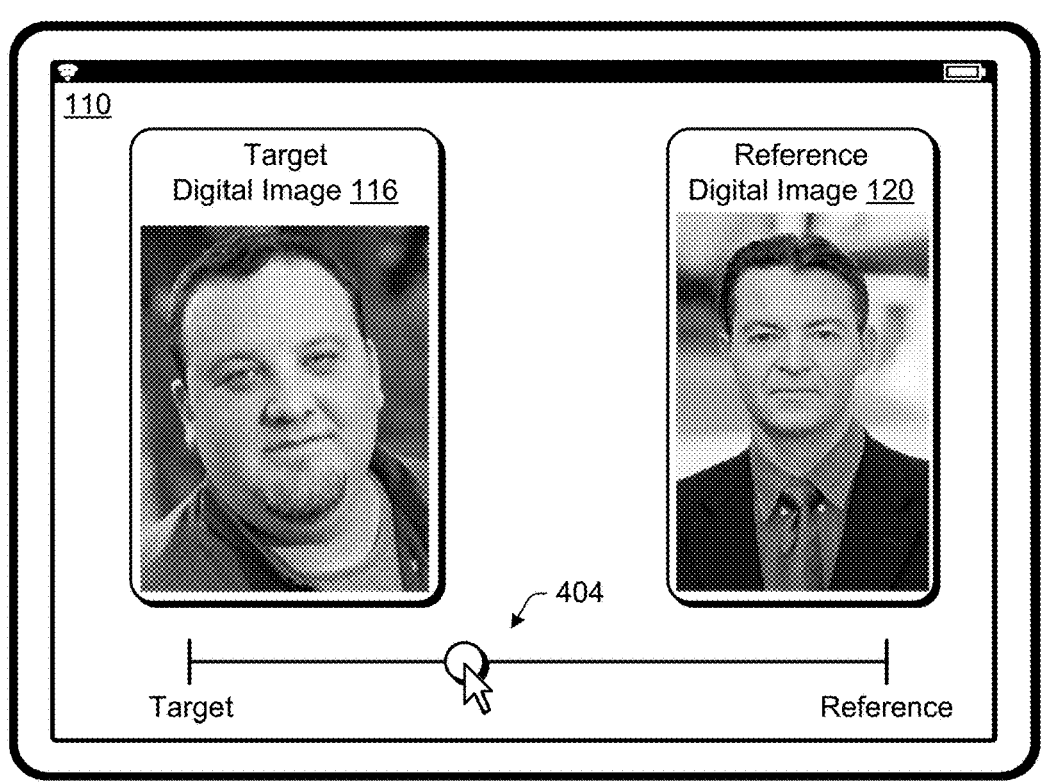
110
Target
Digital Image 116
Reference
Digital Image 120
404
Target
Reference
406
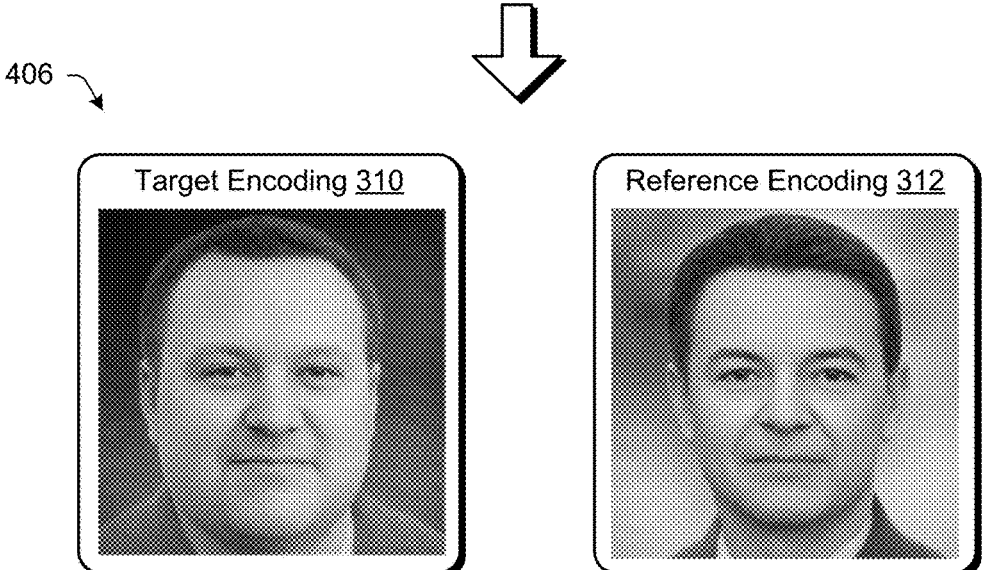
Target Encoding 310
Reference Encoding 312
*Fig. 4*

500

502

504

Figure 6:
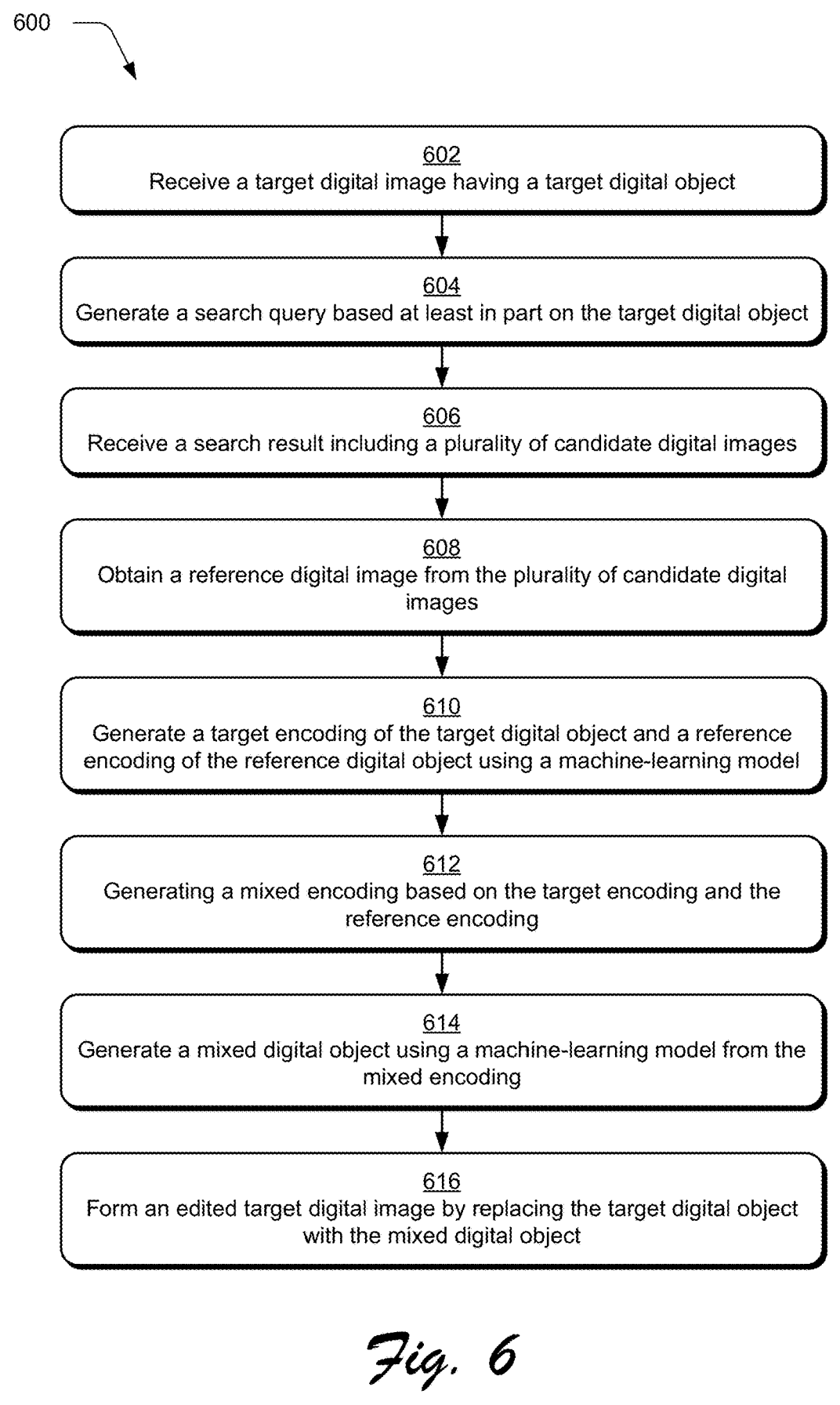

600

602
Receive a target digital image having a target digital object

↓

604
Generate a search query based at least in part on the target digital object

↓

606
Receive a search result including a plurality of candidate digital images

↓

608
Obtain a reference digital image from the plurality of candidate digital images

↓

610
Generate a target encoding of the target digital object and a reference encoding of the reference digital object using a machine-learning model

↓

612
Generating a mixed encoding based on the target encoding and the reference encoding

↓

614
Generate a mixed digital object using a machine-learning model from the mixed encoding

↓

616
Form an edited target digital image by replacing the target digital object with the mixed digital object

Platform 716

Resources 718

Digital Object
Editing System 106

Cloud
714

Computing Device 702

Processing
System 704

Hardware
Elements 710

Computer-readable
Media 706

Memory/
Storage 712

I/O
Interfaces 708

FACE ANONYMIZATION IN DIGITAL IMAGES

RELATED APPLICATIONS

This application is a continuation of and claims priority to U.S. patent application Ser. No. 17/094,093, filed Nov. 10, 2020, entitled "Face Anonymization in Digital Images", the entire disclosure of which is hereby incorporated by reference herein in its entirety.

BACKGROUND

Stock digital images, as made available via service provider systems via a network, unite contributors which have captured the digital images with content creators that use these digital images in a multitude of ways as part of creating digital content. A content creator, for instance, accesses the service provider system via the network to locate and license digital images having particular scenes, objects, and so on that are then used to create digital content such as posters, advertisements, webpages, and so on. The contributor that captured the digital image is then remunerated for the licensing of the digital image via the service provider system by the content creator. As a result, content creators have ready access to millions of digital images without being tasked, themselves, with the capture of the digital images and contributors are provided with an ability to make these digital images available to millions of potential customers around the globe.

One of the challenges involved in the capture and use of digital images, however, involves obtaining and verifying rights to digital objects captured in the digital images, especially those involving humans. Consider an example in which a contributor captures a digital image of a human model in a crowded location, such as near a popular landmark. The contributor in this example readily obtains a release from the human model for use in the digital image and thus is free to make this digital image available via the service provider system as a stock resource.

However, in some situations it is difficult if not impossible for the contributor to also obtain a release from other people that are also captured in the digital image, especially if those people are unknown to the creative professional. The digital image of the human model at the popular landmark, for instance, typically includes people in a background of the digital image that are also visiting the landmark but are unknown to the contributor. A lack of an ability of the contributor to also obtain a release from these other people in the background of the digital image limits an ability to share the digital image via the service provider system and thus limits accessibility of these types of digital images to content creators via the service provider system.

SUMMARY

Face anonymization techniques are described that overcome conventional challenges to generate an anonymized face within a digital image. The anonymized face as generated by a digital object editing system appears realistic but does not correspond to an actual human being and thus is usable without licensing or other issues encountered by conventional techniques. In one example, the digital object editing system receives a target digital image having a target face that is to be anonymized. In response, the digital object editing system generates a search query that includes the target face for use as part of a digital image search, e.g., by a stock service provider system. A reference digital image is then selected from a search result from the digital image search (e.g., manually by a user or automatically by the system) that includes a reference face.

The digital object editing system is configured to generate an anonymized face based on the target face and the reference face. As part of this, the digital object editing system employs an encoder as part of machine learning to extract a target encoding (e.g., as latent vectors) of the target face and a reference encoding of the reference face. The digital object editing system then generates a mixed encoding from the target and reference encodings, e.g., using linear interpolation of the latent vectors.

The mixed encoding is employed by a machine-learning model of the digital object editing system to generate a mixed face, e.g., as a generator module as part of a neural network. An object replacement module is then used by the digital object editing system to replace the target face in the target digital image with the mixed face, e.g., using a three-dimensionally aware face component transfer technique. As a result, the face in the target digital image is anonymized using the mixed face.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIG. 2 depicts a system in an example implementation of an image search used to locate a reference digital image based at least in part on a target digital image.

FIG. 4 depicts example implementation of a target digital image, a reference digital image, and a control usable to specify amounts of digital object to be mixed to generate a mixed digital object.

FIG. 6 is a flow diagram depicting a procedure in an example implementation of mixed digital object generation using machine learning based on a target digital object and a reference digital object to generate an edited digital image.

DETAILED DESCRIPTION

Overview

Figure 1:
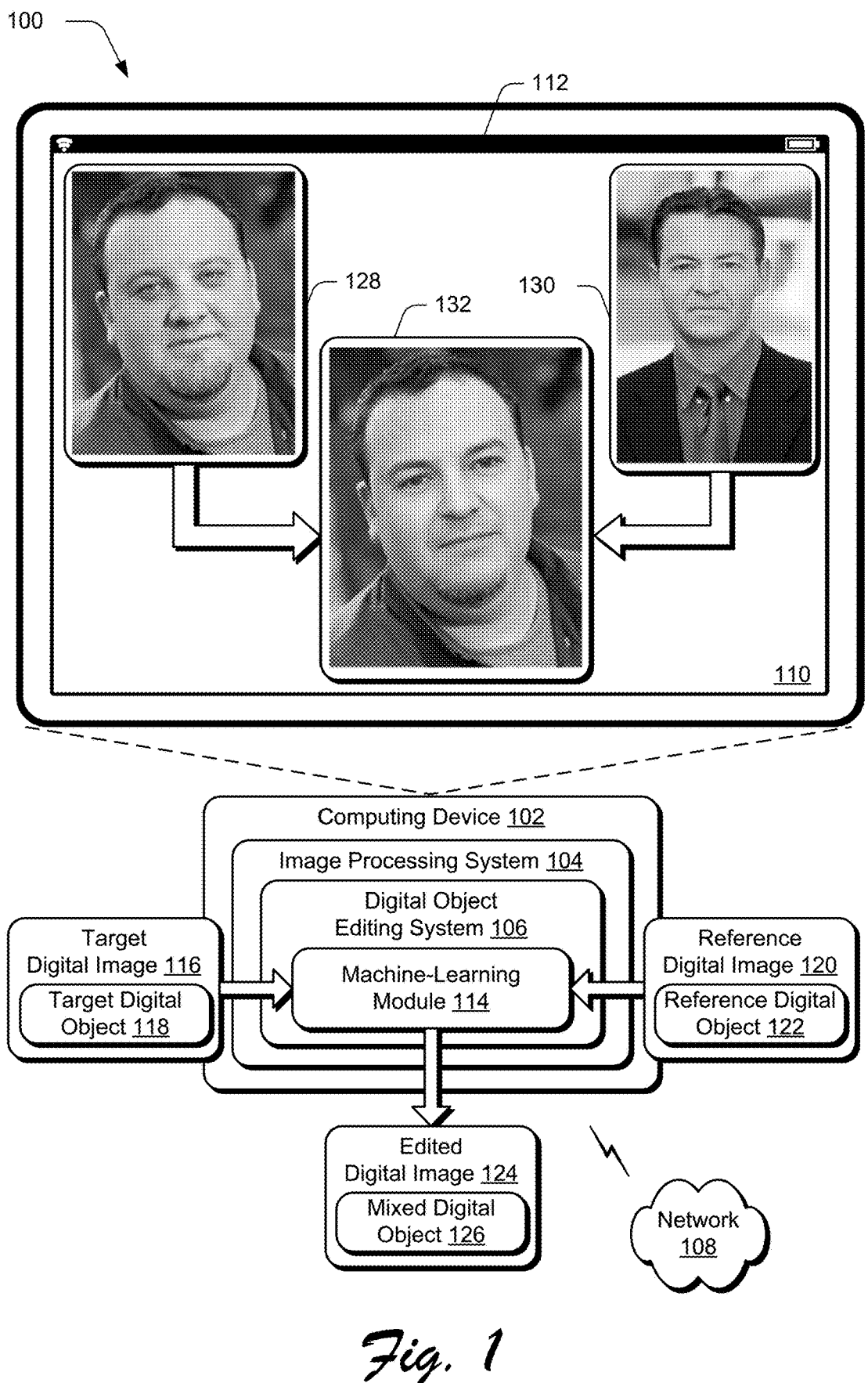
FIG. 1 is an illustration of an environment in an example implementation that is operable to employ digital object editing techniques described herein.

Stock digital images are used to capture a wide range of visual experiences. However, in some instances it is difficult to verify that content captured by the digital images is available for dissemination. For example, a digital image may capture recognizable people but a contributor that captured the digital image does not include releases from those people for use of their likeness in the image. Similar complications arise for branded material, e.g., particular brands of shoes, cars, or other digital objects. Other complications arise for potentially sensitive subject matter that is captured by the digital images, e.g., political, pharmaceutical, and so forth. Although techniques have been developed to address these challenges, these conventional techniques support limited user control, require use of machine-learning models that are trained for particular digital objects, and often result in alterations to the digital image as a whole, e.g., to change both a digital object and a background surrounding the digital object in the digital image.

Accordingly, anonymization techniques are described that overcome these challenges to generate an anonymized digital object (e.g., an anonymized face) within a digital image that appears realistic but does not correspond to an actual human being. As a result, the anonymized digital object is usable without licensing or other issues caused by conventional techniques.

In an example of a face, a digital object editing system receives a target digital image having a target face that is to be anonymized. The digital object editing system generates a search query that includes the target face for use as part of a digital image search, e.g., by a stock service provider system. A search result including candidate digital images is received in response to the image search and used to select a reference digital image having a reference face that is to be "mixed" with the target face. The image search is performable by the stock service provider system based on a variety of considerations, such as based on color (e.g., facial skin color), facial pose, facial features (e.g., face feature descriptors), and so forth. In one example, the search result is output for user selection to indicate which of the candidate digital images is to be used as the reference digital image. In another example, the reference digital image is selected from the candidate digital images by the digital object editing system, automatically and without user intervention, based on visual similarity of the reference face to the target face. Other examples are also contemplated, such as instances in which the reference digital image is specified manually via user input that is not the basis of an image search.

Regardless of how the reference digital image is originated, the digital object editing system is then configured to generate an anonymized face based on the target face and the reference face. To do so, the digital object editing system employs an encoder as part of machine learning to extract a target encoding (e.g., as latent vectors) of the target face from the target digital image and a reference encoding (e.g., as latent vectors) of the reference face from the reference digital image.

The digital object editing system then generates a mixed encoding from the target and reference encodings, e.g., using linear interpolation. The mixed encoding is utilized by a machine-learning model of the digital object editing system to generate a mixed face, e.g., as a generator module as part of a neural network. An object replacement module is utilized by the digital object editing system to then replace the target face in the target digital image with the mixed face, e.g., using a three-dimensionally aware face component transfer technique. In this way, an edited digital image is generated that includes a background of the target digital image with the target face replaced with the mixed face. Further, the mixed face is usable without obtaining a license because this face does not visually represent an actual human being or any other object that has limited availability, e.g., a branded object.

In one example, a control is output in a user interface via which a user input is received to specify amounts of the target encoding and/or the reference encoding to be used in generating the mixed encoding. This is usable, for instance, to specify "how much" the target face is anonymized based on the reference face. Further, although use of these techniques for anonymizing faces has been described, these techniques are also usable to anonymize other digital objects, e.g., to remove characteristics from a digital object that are indicative of a particular brand. Other examples are also contemplated, such as to modify faces based on characteristics extracted from a user-specified reference digital image. A user, for instance, may specify a reference digital image having a younger version of the user to reduce an appearance of a user's age in a target digital image. Further discussion of these and other examples are included in the following sections and shown in corresponding figures.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ digital object editing techniques described herein. The illustrated environment 100 includes a computing device 102 that is configurable in a variety of ways.

The computing device 102, for instance, is configurable as a desktop computer, a laptop computer, a mobile device (e.g., assuming a handheld configuration such as a tablet or mobile phone as illustrated), and so forth. Thus, the computing device 102 ranges from full resource devices with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 7.

The computing device 102 is illustrated as including an image processing system 104. The image processing system 104 is implemented at least partially in hardware of the computing device 102 to process and transform a digital image, an example of this is illustrated as a digital object editing system 106. Although this functionality is illustrated as implemented locally at the computing device 102, functionality of the image processing system 104 and digital object editing system 106 is implementable, in whole or in part, remotely via a network 108 such as part of a web service or "in the cloud." Processing as implemented by the image processing system 104 includes creation of a digital image, modification of a digital image, and rendering of the digital image in a user interface 110 for output, e.g., by a display device 112.

The digital object editing system 106 as illustrated includes a machine-learning module 114. The machine-learning module 114 is configured to accept as an input a target digital image 116 having a target digital object 118 and a reference digital image 120 having a reference digital object 122. Based on these digital objects, the machine-learning module 144 generates an edited digital image 124 having a mixed digital object 126 using machine learning techniques, e.g., one or more neural networks.

Mixing of the target digital object 118 with the reference digital object 122 is usable to support a wide range of functionality. In the illustrated example in the user interface 110, a target digital image 128 includes a target face and a reference digital image 130 includes a reference face. From this, the digital object editing system 106 generates an edited digital image 132 in which the target face from the target digital image 128 is replaced with a mixed face. The mixed face is generated by combining features of the target and reference faces, and as such, does not correspond to an actual human being. In this way, the mixed face included in the edited digital image 132 is anonymized and thus usable without obtaining a release, e.g., by a stock digital image system.

Other examples are also contemplated, such as to modify faces based on characteristics extracted from a user-specified reference digital image. A user, for instance, may specify a reference digital image having a younger version of the user to reduce an appearance of a user's age in a target digital image. These techniques are also usable for digital objects that do not depict faces. The digital object editing system 106, for instance, is usable to anonymize a digital object of a particular brand of shoe, automobile, and so forth to remove characteristics that are indicative of the particular brand. Other examples are also contemplated, further discussion of which is included in the following sections and shown in corresponding figures.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Digital Object Editing Using Target and Reference Objects

Figure 3:
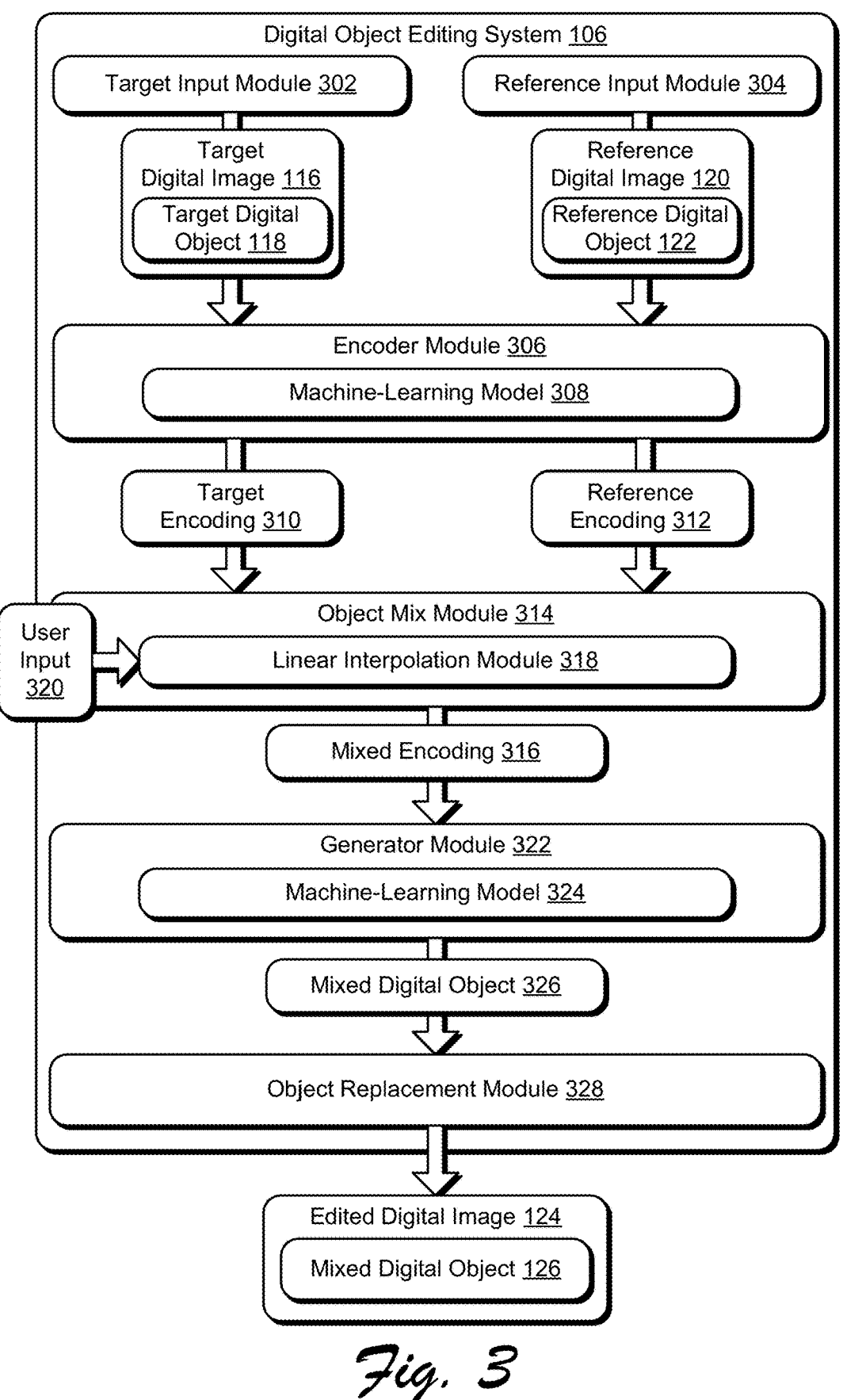
FIG. 3 depicts a system showing operation of a digital object editing system of FIG. 1 in greater detail.
Figure 5:
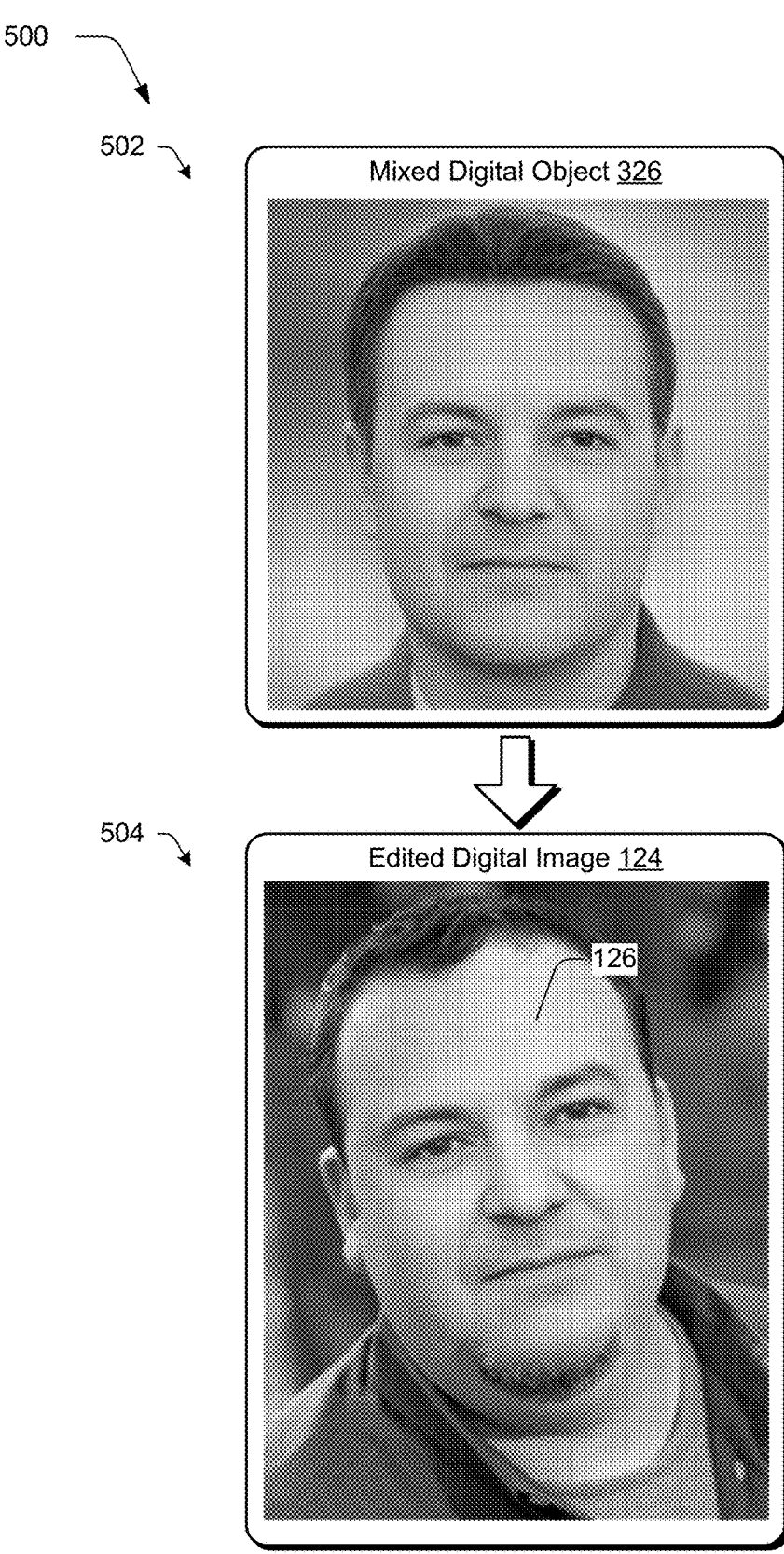
FIG. 5 depicts examples of a mixed digital object and an edited digital image in which a target digital object is replaced with the mixed digital object.

FIG. 2 depicts a system 200 in an example implementation of an image search used to locate a reference digital image based at least in part on a target digital image. FIG. 3 depicts a system 300 showing operation of a digital object editing system 106 of FIG. 1 in greater detail. FIG. 4 depicts an example implementation 400 of a target digital image, a reference digital image, and a control usable to specify amounts of digital object to be mixed to generate a mixed digital object. FIG. 5 depicts examples 500 of a mixed digital object and an edited digital image in which a target digital object is replaced with the mixed digital object. FIG. 6 depicts a procedure 600 in an example implementation of mixed digital object generation using machine learning based on a target digital object and a reference digital object to generate an edited digital image.

The following discussion describes techniques that are implemented utilizing the previously described systems and devices. Aspects of each of the procedures are implemented in hardware, firmware, software, or a combination thereof.

The procedures are shown as a set of blocks that specify operations performed by one or more devices and are not necessarily limited to the orders shown for performing the operations by the respective blocks. In portions of the following discussion, reference is made interchangeably to FIGS. 1-6.

This example begins with an image search that is used by the digital object editing system 106 to locate a reference digital image 120 based on the target digital image 116, and more particularly a target digital object 118 included therein. To do so, a target digital image 116 having a target digital object 118 is received (block 602) by a search query module 202. From this, the search query module 202 generates a search query 204 based at least in part on the target digital object 118 (block 604), which in this instance is communicated to a service provider system 206 via a network 108.

The service provider system 206 includes an image search system 208 that is configured to search a plurality of digital images 210, which are illustrated as maintained in a storage device 212. A search result 214 is formed as a basis of this image search and includes a plurality of candidate digital images 216 (block 606). The search result 214 is communicated by the image search system 208 and received by the digital object editing system 106.

The reference digital image 120, and more particularly the reference digital object 122, is selected from the candidate digital images 216 for use in processing by the digital object editing system 106. In one example, the digital object editing system 106 outputs representations of the candidate digital images 216 in a user interface and the reference digital image 120 is selected via a user input received via the user interface 110. In another example, the reference digital image 120 having a reference visual object 122 that is most visually similar to the target digital object 118 (e.g., based on similarity score) is selected automatically and without user intervention by the digital object editing system 106.

In an implementation, the image search is performed to locate a reference digital object 122 that is visually similar to the target digital object 118. Because of this, a mixed visual object generated by the digital object editing system 106 is visually close to the target digital object 118 and thus supports increased realism when used to edit the target digital image 116 by replacing the target digital object 118 with a mixed digital object. Visual similarity is incorporated as part of the image search by the image search system 208 using a variety of different techniques, examples of which include color as represented by a color search module 218, pose as represented by a pose search module 220, and features as represented by a feature search module 222. A variety of other examples are also contemplated for use by the image search system 208 without departing from the spirit and scope of the techniques described herein.

As part of color in a face anonymization example, the color search module 218 is configured to preprocess digital images using face crop and alignment as shown in a second stage 406 of FIG. 4. A segmentation module is also employed to implement object segmentation techniques (e.g., a skin segmentation model to extract a skin portion of the face in a face scenario) to extract the target digital object 118 from the target digital image 116. An inpainting function is then used to fill in areas that do not pertain (i.e., are not salient) to the target digital object 118 in the search query 204. This is performed such that portions of the search query 204 that pertain to the target digital object 118 and portions do not pertain to the target digital object 118 exhibit smooth transitions therebetween and preserve lighting of the target digital object 118 as exhibited in the target digital image 116 and thus maintains realism.

The color search module 218 also incorporates resizing and color space techniques. The color search module 218, for instance, resizes the "filled" search query 204 to 32×32, and converts a color space used by the search query 204 into an LAB color space, which is then flattened to form a feature vector, e.g., having a length of 1024. The LAB color space, in practice, exhibits improved functionality in maintaining facial lighting details, although other color spaces may also be utilized by the color search module 218.

The pose search module 220 is configured to address pose of digital objects as part of an image search. In a face anonymization example, the pose search module 220 extracts a facial pose of the target digital object 118 as a three-dimensional face shape model. The pose search module 220 then generates a camera rotation matrix to extract angles in "X," "Y," and "Z" directions, e.g., using a "eulerAngles" function from an Eigen library. The pose of the digital objects is expressed as a pose feature vector having a length in the X," "Y," and "Z" directions.

The feature search module 222 is representative of functionality to leverage feature descriptors learned using a model trained using machine learning, e.g., a deep convolutional neural network. A variety of different techniques are usable by the feature search module 222 to do so, an example of which is described by Sun, K, Xiao, B., Liu, D., Wang, *"Deep high-resolution representation learning for human pose estimation." In: CVPR.* (2019), the entire disclosure of which is hereby incorporated by reference.

In an implementation, the color search module 218, pose search module 220, and feature search module 222 precompute pose vectors, color vectors, and feature vectors for the digital images 210 that are used as a basis for the image search, thereby supporting real time operation. Therefore, in order to perform the search pose, color and feature vectors are computed for the target digital object 118 in the search query 204.

A similarity score is then computed to define which digital images 210 are visually similar to the target digital object 118. For pose, a cosine similarity is used and for color and features a dot product is used. Feature types are normalized as follows:

$$similarity_{ti} = \frac{similarity_{ti} - \min(similarity_t)}{\max(similarity_t) - \min(similarity_t)}$$

and then combined based on the following expression:

$$distance_i = \sum w_t \times \exp(-similarity_{ti})$$

where "t" is one of the three features, "i" is the "ith" digital image 210 and "w" is the weight for each feature. Each of the weights sum to one in this example as part of a single similarity score that defines a result of comparing the search query 204 with each of the digital images 210. Equation (1) is not used for pose, since cosine distance is between 0 and 1. In this example, the smaller the value of the similarity score, the closer the digital image 210 is considered, visually, to the search query 204.

In one example, the digital object editing system 106 selects a reference digital image 120 from the candidate digital images 216 of the search result 214 (block 608), e.g., based on the similarity score. In another example, the candidate digital images 216 are output via a user interface 110 and a user input is received that selects the reference digital image 120. Accordingly, a target input module 302 of the digital object editing system 106 obtains the target digital image 116 having the target digital object 118 and a reference input module 304 obtains a reference digital image 120 having a reference digital object 122, which are passed to an encoder module 306.

The encoder module 306 is leveraged by the digital object editing system 106 to employ a machine-learning model 308 to generate a target encoding 410 of the target digital object 118 and a reference encoding 312 of the reference digital object 122 (block 610). Examples of preprocessing techniques usable before generating the target and reference encodings 310, 312 are illustrated at a second stage 406 of FIG. 4 that include facial alignment and smoothing. The machine-learning model 308, for instance, is configured as an encoder of a neural network that generates latent vectors describing the target digital object 118 (e.g., a target face) and latent vectors describing the reference digital object 122 (e.g., a reference face). The target and reference encodings 310, 312 are then output by the encoder module 306 to an object mix module 314.

The object mix module 314 is configured to generate a mixed encoding 316 based on the target encoding 310 and the reference encoding 312 (block 612). In one example, a linear interpolation module 318 is used to perform linear interpolation of the latent vectors of the target and reference encodings 310, 312. Linear interpolation is a technique involving curve fitting in which linear polynomials are used to contrast data points to generate the mixed encoding 316 within a range of a discrete set of known data points, i.e., defined by the target and reference encodings 310, 312.

In an implementation as shown at a first stage 402 of FIG. 4, a control 404 is used to define respective amounts of the target and reference encodings 310, 312 and therefore a user input 320 defines this amount. Therefore, in this example linear interpolation is performable using the two latent vectors defined by the target and reference encodings 310, 312 using a ratio (e.g., from "0" to "1") as defined by the user input 320 as follows:

$$resultLatentVector = \alpha * latentVector_{target} + (1 - \alpha) \times latentVector_{reference}$$

As a result, linear interpolation is used to estimate the mixed encoding 316 as a straight line defined between data points defining the latent vectors of the target and reference encodings 310, 312, a proportion of which is defined by the user input 320.

The mixed encoding 316 is passed from the object mix module 314 as an input to a generator module 322. The generator module 322 is configured to generate a mixed digital object 326 based on the mixed encoding 316 using a machine-learning model 324 (block 614). The machine-learning model 324, for instance, is configured as a decoder as part of a neural network to convert latent vectors of the mixed encoding 316 into pixels forming the mixed digital object 326. The decoder, for instance, is trainable as part of a generator architecture of a generative adversarial network (GAN). An example of the mixed digital object 326 is illustrated at a first stage 502 of FIG. 2 in which the mixed digital object 326 shares visual characteristics of both the target digital object 118 and the reference digital object 122.

An edited target digital image 124 is formed by an object replacement module 328 by replacing the target digital object 118 with the mixed digital object 326 (block 616) in the target digital image 116. In this way, a background of the target digital image 116 is preserved, which is not possible using conventional techniques. A variety of techniques are usable to replace the digital objects, such as patch match techniques, three-dimensional modeling techniques, and so on. For example, a three-dimensional based technique is usable as described by Yang, F., Wang, J., Shechtman, E., Bourdev, L., Metaxas, D.: *Expression flow for 3d-aware face component transfer*. In: ACM SIGGRAPH 2011 Papers. SIGGRAPH '11, New York, NY, USA, Association for Computing Machinery (2011), the entire disclosure of which is hereby incorporated by reference.

This technique has been modified in this example to support high-frequency transfer, e.g., to add back facial skin details from a target digital object 118 (e.g., a target face) to a mixed digital object (e.g., a mixed face). To do so, high frequency data is extracted from a skin area of a target face, and high frequency data from the skin area is subtracted from a mixed face, which is added back to the target face's high frequencies to the mixed face. The extraction of high frequency details is achieved using an "opencv" bilateral filter function as described by Bradski, G.: The OpenCV Library. *Dr. Dobb's Journal of Software Tools* (2000), the entire disclosure of which is hereby incorporated by reference. In this way, a target digital object's 118 high frequency details are preserved as part of the mixed object (i.e., a result face) as follows:

$$resultFace = highFrequency_{target} + (resultFace - highFrequency_{resultFace})$$

An example of an edited digital image 124 having a mixed digital object 126 is illustrated as a second stage 504 of FIG. 5. In this way, a target face is anonymized by mixing visual characteristics using machine learning with a reference face. Other examples are also contemplated, such as to remove brand identifying features as part of non-facial objects, use in modifying digital image (such as to make a target digital object appear younger by using a younger version of the object as depicted in a reference digital object), and so on.

Example System and Device

Figure 7:
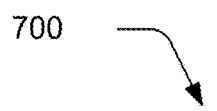
FIG. 7 illustrates an example system including various components of an example device that can be implemented as any type of computing device as described and/or utilize with reference to FIGS. 1-6 to implement embodiments of the techniques described herein.

FIG. 7 illustrates an example system generally at 700 that includes an example computing device 702 that is representative of one or more computing systems and/or devices that may implement the various techniques described herein. This is illustrated through inclusion of the digital object editing system 106. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media.

The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   receiving, by a processing device, a target digital image depicting a target face;
   automatically editing, by the processing device, the target digital image to remove a portion of the target digital image around the target face;
   encoding, by the processing device using a machine learning model, data related to the target digital image to generate a target encoding including feature vectors representing three-dimensional aspects of a pose of the target face;
   generating, by the processing device using the machine learning model, data including a descriptor of the pose of the target face based on the target encoding;
   generating, by the processing device, a search query for a reference face in a reference digital image based on the descriptor of the pose of the target face;
   automatically selecting, by the processing device, the reference digital image from candidate digital image results resulting from the search query by comparing the feature vectors representing the three-dimensional aspects of the pose of the target face and feature vectors representing three-dimensional aspects of poses of candidate faces of the candidate digital image results; and
   generating, by the processing device, a mixed face by editing the target digital image to incorporate a portion of the reference face.

2. The method of claim 1, wherein the descriptor of the pose of the target face indicates a facial pose or a facial feature.

3. The method of claim 1, further comprising cropping the reference face from the reference digital image.

4. The method of claim 1, further comprising extracting the target encoding from the target face and a reference encoding from the reference face.

5. The method of claim 4, wherein the mixed face is generated by mixing the target encoding with the reference encoding.

6. The method of claim 5, wherein the target encoding is mixed with the reference encoding using linear interpolation.

7. The method of claim 1, further comprising replacing the target face in the target digital image with the mixed face.

8. The method of claim 1, wherein automatically selecting the reference digital image further comprises comparing a three-dimensional target face shape model with a three-dimensional reference face shape model.

9. The method of claim 1, further comprising encoding, using the machine learning model, the candidate digital image results to generate the feature vectors representing the three-dimensional aspects of the poses of the candidate faces of the candidate digital image results.

10. The method of claim 1, wherein a similarity score defines a level of visual similarity between the pose of the target face and the poses of the candidate faces of the candidate digital image results for automatically selecting the reference digital image.

11. A system comprising:

a memory component; and a processing device coupled to the memory component, the processing device to perform operations comprising:

receiving a target digital image depicting a target object;

automatically editing the target digital image to remove a portion of the target digital image around the target object;

encoding, using a machine learning model, data related to the target digital image to generate a target encoding including feature vectors representing three-dimensional aspects of a pose of the target object;

generating, using the machine learning model, data including a descriptor of the pose of the target object based on the target encoding;

generating a search query for a reference object in a reference digital image based on the descriptor of the pose of the target object;

executing a search of digital images using the search query;

automatically selecting the reference digital image from candidate digital image results resulting from the search query by comparing the feature vectors representing the three-dimensional aspects of the pose of the target object and feature vectors representing three-dimensional aspects of poses of candidate objects of the candidate digital image results; and generating a mixed object by editing the target digital image to incorporate a portion of the reference object.

12. The system of claim 11, wherein the descriptor of the pose of the target object indicates a feature of the target object.

13. The system of claim 11, further comprising extracting the target encoding from the target object and a reference encoding from the reference object.

14. The system of claim 13, wherein the mixed object is generated by mixing the target encoding with the reference encoding.

15. The system of claim 14, wherein the target encoding is mixed with the reference encoding using linear interpolation.

16. The system of claim 11, further configured to perform operations comprising encoding, using the machine learning model, the candidate digital image results to generate the feature vectors representing the three-dimensional aspects of the poses of the candidate objects of the candidate digital image results.

17. A non-transitory computer-readable storage medium storing executable instructions, which when executed by a processing device, cause the processing device to perform operations comprising:

receiving a target digital image depicting a target face;

automatically editing the target digital image to remove a portion of the target digital image around the target face;

encoding, using a machine learning model, data related to the target digital image to generate a target encoding including feature vectors representing three-dimensional aspects of a pose of the target face;

generating, using the machine learning model, data including a descriptor of the pose of the target face based on the target encoding;

generating a search query for a reference face in a reference digital image based on the descriptor of the pose of the target face;

automatically selecting the reference digital image from candidate digital image results resulting from the search query by comparing the feature vectors representing the three-dimensional aspects of the pose of the target face and feature vectors representing three-dimensional aspects of poses of candidate faces of the candidate digital image results; and generating a mixed face by editing the target digital image to incorporate a portion of the reference face.

18. The non-transitory computer-readable storage medium of claim 17, wherein the descriptor of the pose of the target face indicates a facial pose or a facial feature.

19. The non-transitory computer-readable storage medium of claim 17, further comprising cropping the reference face from the reference digital image.

20. The non-transitory computer-readable storage medium of claim 17, further configured to perform operations comprising encoding, using the machine learning model, the candidate digital image results to generate the feature vectors representing the three-dimensional aspects of the poses of the candidate faces of the candidate digital image results.

* * * * *